С009900785B2

United States Patent
Villardi et al.

(10) Patent No.: US 9,900,785 B2
(45) Date of Patent: Feb. 20, 2018

(54) WIRELESS DEVICE (71) Applicant: NATIONAL INSTITUTE OF INFORMATION AND COMMUNICATIONS TECHNOLOGY, Koganei-shi, Tokyo (JP)

(72) Inventors: Gabriel Porto Villardi, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 72 days.

(21) Appl. No.: 14/760,799

(22) PCT Filed: Jan. 10, 2014

(86) PCT No.: PCT/JP2014/000086
§ 371 (c)(1),
(2) Date: Jul. 14, 2015

(87) PCT Pub. No.: WO2014/112342
PCT Pub. Date: Jul. 24, 2014

(65) Prior Publication Data
US 2015/0365832 A1 Dec. 17, 2015

(30) Foreign Application Priority Data
Jan. 15, 2013 (JP) .................................. 2013-005004

(51) Int. Cl.
H04W 16/26 (2009.01)
H04B 7/06 (2006.01)
(Continued)

(52) U.S. Cl.
CPC .......... *H04W 16/26* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS

2002/0009156 A1  1/2002  Hottinen et al.
2002/0105961 A1  8/2002  Hottinen et al.
(Continued)

FOREIGN PATENT DOCUMENTS

CA  2371384 A1  11/2000
CN  1304587 A   7/2001
(Continued)

OTHER PUBLICATIONS

International Search Report (ISR) dated Apr. 1, 2014 issued in International Application No. PCT/JP2014/000086.
(Continued)

Primary Examiner — Ian N Moore
Assistant Examiner — Ronald h Davis
(74) Attorney, Agent, or Firm — Holtz, Holtz & Volek PC (57) ABSTRACT A wireless device capable of enabling improvement in reliability of communication, enlargement of cell regions, improvement in PER and improvement in system performance is provided. The wireless device according to an embodiment is a wireless device which transmits information for a counterpart wireless device, and includes a signal processing unit which generates a symbol sequence; a transmission vector calculating unit which converts the symbol sequence into a plurality of transmission symbol sequences, and controls phases of the transmission symbol sequences to be a same phase or an opposite phase based on
(Continued)

a channel estimation to the counterpart wireless device; and a plurality of antennas each of which transmits the plurality of transmission symbol sequences.

3 Claims, 8 Drawing Sheets

(51) Int. Cl.
*H04B 7/04* (2017.01)
*H04W 24/02* (2009.01)

(52) U.S. Cl.
CPC ......... *H04B 7/0639* (2013.01); *H04B 7/0682* (2013.01); *H04W 24/02* (2013.01)

(56) References Cited

U.S. PATENT DOCUMENTS

| | | |
|---|---|---|
| 2002/0186785 A1 | 12/2002 | Hoshino et al. |
| 2007/0042717 A1 | 2/2007 | Alexiou et al. |

FOREIGN PATENT DOCUMENTS

| | | |
|---|---|---|
| CN | 1350732 A | 5/2002 |
| CN | 1358357 A | 7/2002 |
| CN | 101395821 A | 3/2009 |
| EP | 1097525 A1 | 5/2001 |
| EP | 1160998 A1 | 12/2001 |
| EP | 1179230 A1 | 2/2002 |
| EP | 1890397 A1 | 2/2008 |
| EP | 1915827 A1 | 4/2008 |
| EP | 2249486 A2 | 11/2010 |
| JP | 2001203614 A | 7/2001 |
| JP | 2003500976 A | 1/2003 |
| JP | 2003500977 A | 1/2003 |
| JP | 2007089228 A | 4/2007 |
| JP | 2008048413 A | 2/2008 |
| JP | 2009505573 A | 2/2009 |
| KR | 1020080033189 A | 4/2008 |
| NO | 20010290 A | 1/2001 |
| WO | 0072464 A1 | 11/2000 |
| WO | 0072465 A1 | 11/2000 |
| WO | 0154304 A1 | 7/2001 |
| WO | 2007021607 A1 | 2/2007 |

OTHER PUBLICATIONS

S. M. Alamouti, "A Simple Transmit Diversity Technique for Wireless Communication", IEEE Journal on Selected Areas in Communications, 16(8), pp. 1451-1458.
V. Tarokh, et al., "Space-Time Block Codes from Orthogonal Designs", IEEE Transactions on Information Theory, 45(5), pp. 744-765.
International Preliminary Report on Patentability (IPRP) including Written Opinion (in English) dated Jul. 30, 2015, issued in parent International Application No. PCT/JP2014/000086.

$P_{tx}=x$ watts          $P_{tx}=y$ watts
                          PER=$z$

|←——————————— d ———————————→|

---

$P_{tx}=x$ watts          $P_{tx}=y$
                          PER=$z$

|←——————————— d ———————————→|

WIRELESS DEVICE

TECHNICAL FIELD

The present invention relates to a wireless communication technology using a plurality of antennas for transmission.

BACKGROUND

In an art of a transmit diversity, it is possible to improve robustness of communication by using an MIMO channel. At this time, a transmission signal is carefully designed as for both space and time, and a rank of an MIMO channel matrix is effectively used. For example, the transmission signal is made to be a quadrature signal, and thereby, it is possible to avoid an array interference generated by using a plurality of antennas. In this art, it is possible to generate an estimation of quadrature information in which the MIMO channel matrix becomes a full rank from a mixed signal of signals transmitted from a plurality of transmission antennas at a reception side. However, in a cellular network or the like covering a wide area, robustness for a deep fading is required at a cell boundary, and an application of only full diversity is not sufficient.

The present invention is one to further provide a gain due to the array interference of a system in addition to maintain a maximum diversity (to provide the MIMO matrix of full rank). This special gain is one which is obtained by carefully designing a transmission symbol transmitted from each of transmission antennas, and the array interference is positively used at the reception side.

In the art of the transmit diversity, the robustness of the communication in the MIMO channel is improved by using space-time block codes or the like. However, in such an art, it is limited to a coefficient of the diversity, and therefore, there is a problem in which a reception quality in a vicinity of a cell boundary and system performance are insufficient.

PRIOR ART DOCUMENT

Non-Patent Document

Non-Patent Document 1: S. M. Alamouti, "A Simple Transmit Diversity Technique for Wireless Communications". IEEE Journal on Selected Areas in Communications 16 (8): 1451-1458.
Non-Patent Document 2: V. Tarokh, H. Jafarkhani, and A. R. Calderbank, "Space-Time Block Codes from Orthogonal Designs", IEEE Transactions on Information Theory 45(5): 744-765.

SUMMARY OF THE INVENTION

Problems to be Solved by the Invention

As stated above, according to the conventional art, there is a problem in which a maximum diversity gain obtained from the rank of the MIMO channel matrix is limited. The present invention is made to solve the problem as stated above, and an object thereof is to provide a wireless device capable of enabling improvement in reliability of communication, enlargement of cell regions, improvement in PER, and improvement in system performance.

Means for Solving the Problems

To solve the above-stated problem, a wireless device according to an embodiment is a wireless device which transmits information for a counterpart wireless device, includes: a signal processing unit which generates a symbol sequence; a transmission vector calculating unit which converts the symbol sequence into a plurality of transmission symbol sequences, and controls phases by the transmission symbol sequences to be a same phase or an opposite phase based on a channel estimation to the counterpart wireless device; and a plurality of antennas which respectively transmit the plurality of transmission symbol sequences.

Effect of the Invention

According to the present invention, it is possible to provide a wireless device capable of enabling improvement in reliability of communication, enlargement of cell regions, improvement in PER, and improvement in system performance.

MODES FOR CARRYING OUT THE INVENTION

A special gain is required to provide a high reception quality for a reception side positioning in a vicinity of a cell boundary and to improve system performance. In a wireless system of the embodiment, the special gain can be obtained by designing a symbol transmitted from a transmission antenna. A total gain of the wireless system is improved by using interference energy obtained by an array interference in addition to a diversity gain obtained from a rank of an MIMO channel matrix. It is thereby possible to improve link reliability compared to a conventional transmit diversity, namely the art using the space-time block codes (STBC).

Specifically, a total gain (diversity gain+array gain) contributes to reduce a bit-error probability (BEP) compared to a case of only the diversity gain generated by the conventional STBC.

First Embodiment

Figure 1:
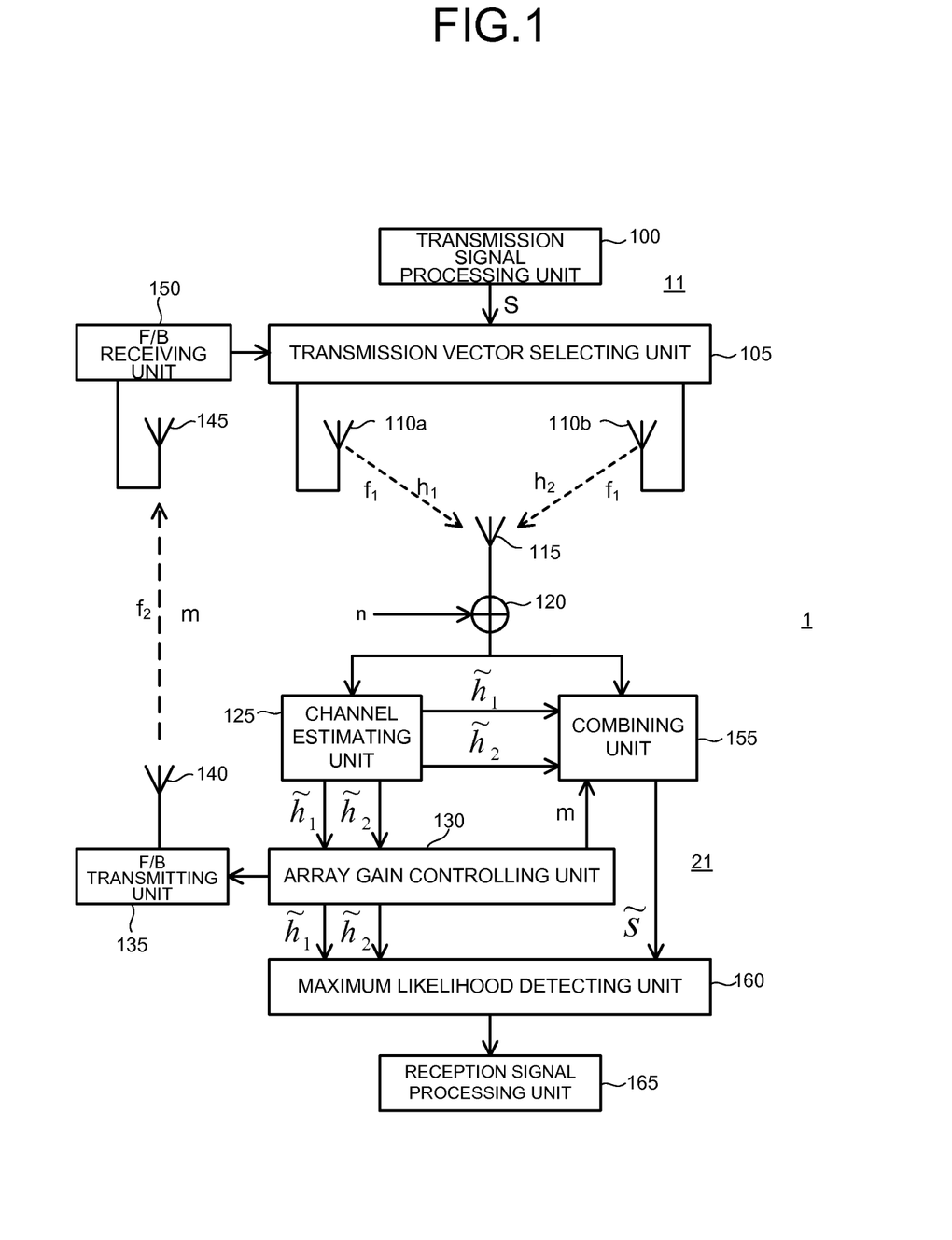
FIG. 1 A block diagram illustrating a configuration of a wireless device according to a first embodiment.

A wireless system according to a first embodiment is described in detail with reference to FIG. 1. As illustrated in FIG. 1, a wireless system 1 according to the first embodiment includes a first wireless device 11 transmitting data sequences, and a second wireless device 21 receiving the data sequences transmitted from the first wireless device 11.

The first wireless device 11 includes a transmission signal processing unit 100 generating a transmission signal including the data sequences, a transmission vector selecting unit 105 outputting a plurality of transmission signals by performing a vector calculation of the data sequences of the transmission signals, and a plurality of transmission antennas respectively transmitting the plurality of transmission signals output from the transmission vector selecting unit 105. In an example illustrated in FIG. 1, two transmission antennas 110a, 110b ($n_t$=2) are array configured as the plurality of transmission antennas.

The transmission signal processing unit 100 generates data sequences transmitted by the first wireless device 11, and generates a high-frequency signal by performing a modulation/frequency conversion. In the embodiment illustrated in FIG. 1, the transmission signal processing unit 100 generates the transmission signal including a data sequence S (symbol sequence) and transmits it to the transmission vector selecting unit 105.

The transmission vector selecting unit 105 distributes the transmission signal into plural, and performs a predetermined vector calculation. The transmission vector selecting unit 105 distributes the received transmission signal, and supplies the data sequence S to each of the transmission antenna 110a and the transmission antenna 110b. In addition, the transmission vector selecting unit 105 controls phases of symbols between the data sequence S supplied to the transmission antenna 110a and the data sequence S supplied to the reception antenna 110b by the vector calculation.

In the embodiment illustrated in FIG. 1, there are two transmission antennas of the first wireless device 11, and therefore, the transmission vector selecting unit 105 performs either a calculation in which transmission symbols of the transmission antennas 110a and 110b are both in a same phase [s s] or a calculation in which the respective transmission symbols are in an opposite phase [s −s]. In the following description, the former calculation is called as a calculation of a transmission vector $G_0$[s s], and the latter calculation is called as a calculation of a transmission vector $G_1$[s −s]. When the calculation of the transmission vector $G_0$ is performed, the transmission antennas 110a and 110b each transmit the same symbol sequence "s", and when the calculation of the transmission vector $G_1$ is performed, the transmission antennas 110a and 110b respectively transmit symbol sequences "s", "−s" in the opposite phase. Namely, the transmission antennas 110a and 110b transmit the symbol sequences in the same phase with each other or the symbol sequences in the opposite phase from one another.

Further, the first wireless device 11 includes a reception antenna 145 and a feedback (F/B) receiving unit 150 which receive a feedback signal from the second wireless device 21. In the wireless system 1 of this embodiment, a frequency $f_1$ transmitted by the first wireless device 11 to the second wireless device 21 and a frequency $f_2$ received by the first wireless device 11 from the second wireless device 21 are different frequencies. Namely, the wireless system 1 of this embodiment constitutes an FDD system. Note that the feedback signal may be transmitted not by wireless but by wired.

The feedback receiving unit 150 receives an index m from the second wireless device 21. The index m indicates the transmission vector which is to be selected by the transmission vector selecting unit 105, and when the "m" is "0" (zero), the transmission vector selecting unit 105 performs the calculation of the $G_0$, and when the "m" is "1", the transmission vector selecting unit 105 performs the calculation of the $G_1$. Namely, the transmission vector selecting unit 105 selects a calculation of a transmission vector $G_m$ based on the index m transmitted from the second wireless device 21.

The second wireless device 21 includes a (reception) antenna 115 receiving a reception signal, a channel estimating unit 125 estimating a channel estimation H by using the reception signal, and an array gain controlling unit 130 calculating an array interference by using the estimated channel estimation H. The channel estimation H is a channel estimation (propagation estimation) of each of a channel $h_1$ (propagation path $h_1$) from the transmission antenna 110a to the reception antenna 115 and a channel $h_2$ (propagation path $h_2$) from the transmission antenna 110b to the reception antenna 115. The array gain controlling unit 130 determines the index m indicating the transmission vector which is to be selected by the first wireless device 11 by using the calculated array interference.

The second wireless device 21 further includes a feedback (F/B) transmitting unit 135 and a transmission antenna 140 which feed back the index m determined by the array gain controlling unit 130 to the first wireless device 11, a combining unit 155 which calculates a symbol estimation S by using the channel estimation H and the index m, a maximum likelihood decision unit 160 which generates a reception data sequence by using the channel estimation H and the symbol estimation S, and a reception signal processing unit 165 which processes the reception data sequence. The index m is just to indicate the transmission vector which is to be selected by the first wireless device 11, and therefore, a circuit of the frequency $f_2$ which is transmitted by the feedback transmitting unit 135 is not necessarily be a wide band.

Operations of First Embodiment

Figure 2:
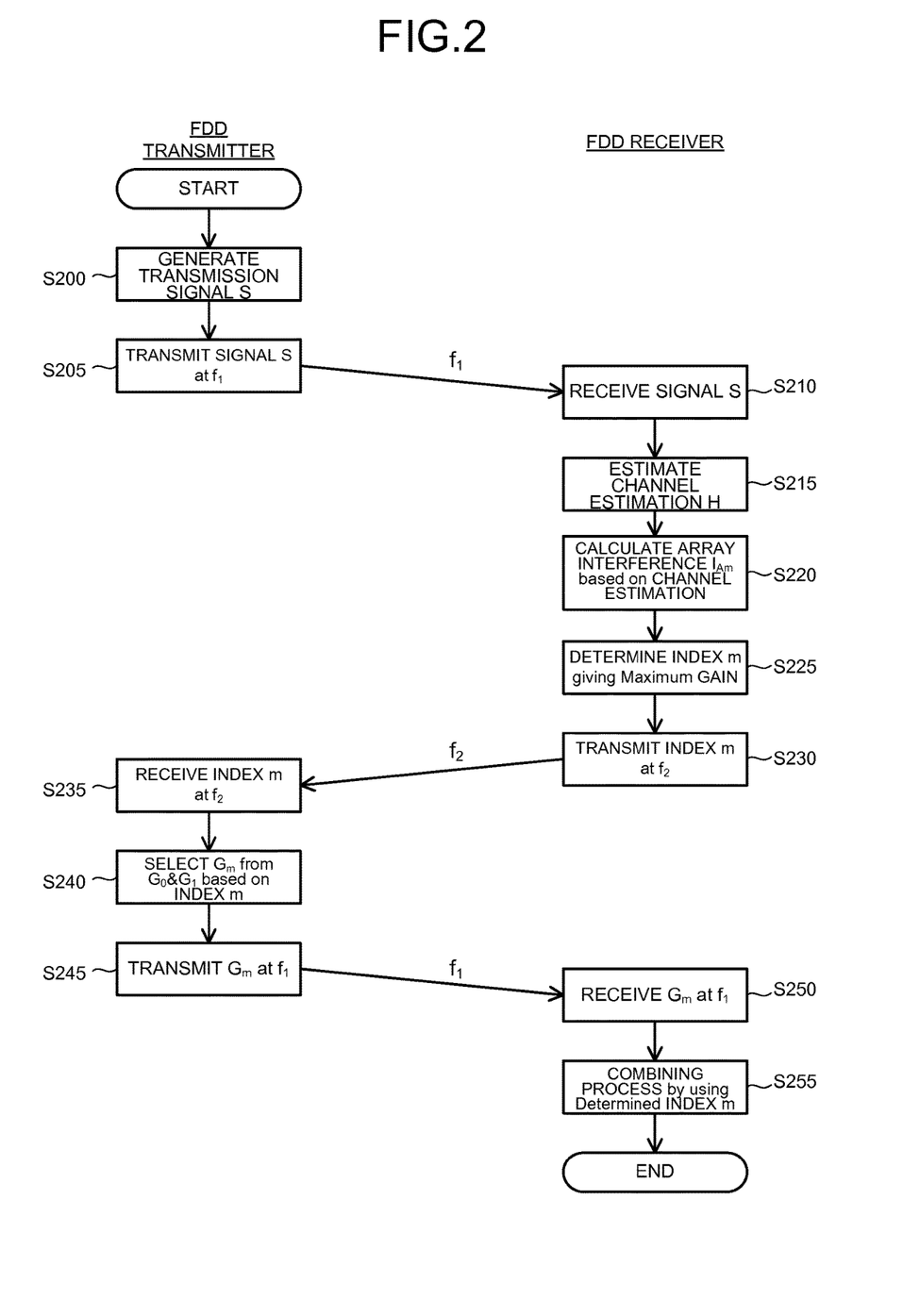
FIG. 2 A flowchart illustrating operations of the wireless device according to the first embodiment.

Operations of the wireless system 1 of the first embodiment are described with reference to FIGS. 1 and 2. In the wireless system of this embodiment, the index m which is used by the first wireless device 11 being a transmission side to determine the transmission vector $G_m$ is generated by the second wireless device 21 being a reception side. Namely, the second wireless device 21 performs a channel estimation of a propagation path from the first wireless device 11 to the second wireless device 21. Therefore, the first wireless device 11 transmits a radio wave for the channel estimation as a first stage. The transmission signal processing unit 100 generates the transmission signal S at the frequency $f_1$ (step 200. Hereinafter, referred to as "S200"), and the transmission vector selecting unit 105 temporality performs the calculation of the transmission vector $G_0$. The transmission antennas 110a, 110b each transmit the transmission signal S in the same phase (S205).

The reception antenna 115 of the second wireless device 21 receives the transmission signals S via transmission paths $h_1$ and $h_2$ (S210). At this time, noises n are mixed into the reception signal at the second wireless device 21 (120 in FIG. 1).

The channel estimating unit 125 performs the channel estimation based on the reception signal (S215). In a system in which there are two transmission side antennas and one reception side antenna as illustrated in FIG. 1, namely, in an MISO (the Multiple-Input-Single-Output) configuration system, a channel vector H is represented by a mathematical expression 1.

[Expression 1]

$$H = [h_1 h_2] \in \mathbb{C}^{1 \times nt} \qquad (I)$$

At a frequency band of the VHF/UHF band such as the TV white space (TVWS), Doppler diffusion is small, and therefore, the channel vector H has a quasi-static and extremely low time selectivity. Namely, the channel vector H of this embodiment has a relatively small temporal variation. The channel estimating unit 125 transmits the obtained channel estimation to the array gain controlling unit 130.

The array gain controlling unit 130 calculates an array interference $I_{Am}$ by using the obtained channel estimation (S220). In the system of the MISO configuration, there are two peculiar transmission vectors $G_m$ (m=0, 1), and the respective $G_m$ ($G_0$, $G_1$) generate the array interferences $I_{Am}$ ($I_{A1}$, $I_{A2}$) respectively corresponding thereto. The array interference $I_{Am}$ is a function of a fading channel H, and therefore, it is possible to calculate in advance. Accordingly, the array interference $I_{Am}$ can be stored at a memory in the channel estimating unit 125 of the second wireless device 21, and it is possible to calculate a total gain by using the channel estimation. The array gain controlling unit 130 compares the two $I_{Am}$ and selects one which takes a maximum value (mathematical expression 2).

[Expression 2]

$$\operatorname*{argmax}_{m}(I_{Am}), \forall m \in \{0, 1\} \qquad (2)$$

When it is assumed that the Doppler frequency is low such as the VHF/UHF band and a transmission path H does not largely change, the $G_m$ becomes a factor controlling a total gain of the system. The array gain controlling unit 130 searches the $I_{Am}$ in which the total gain of the system becomes the maximum via the channel estimation.

When the $I_{Am}$ in which the total gain of the system becomes the maximum is selected, the array gain controlling unit 130 determines the index m which corresponds to the $I_A$, and transmits to the feedback transmitting unit 135 and the combining unit 155 (S225). The feedback transmitting unit 135 transmits the index m determined by the array gain controlling unit 130 to the first wireless device 11 as the feedback signal at the frequency $f_2$ (S230).

The feedback receiving unit 150 of the first wireless device 11 receives the feedback signal via the reception antenna 145, and transmits the index m to the transmission vector selecting unit 105 (S235).

The transmission vector selecting unit 105 selects the transmission vector $G_m$ from the $G_0/G_1$ based on the received index m, and performs the calculation of the transmission vector $G_m$ for the transmission signal S (S240). The transmission vector selecting unit 105 transmits the signals of [s s] or [s -s] from the transmission antennas 110a and 110b in accordance with the transmission vector $G_m$ (S245). For example, when the index m fed back from the second wireless device 21 is "1", the first wireless device 11 performs the calculation of the $G_1$, and transmits "s" from the transmission antenna 110a and "-s" from the transmission antenna 110b.

The second wireless device 21 receives the transmission signals S each of which is performed the calculation of the transmission vector $G_m$ via the reception antenna 115 (S250). The combining unit 155 performs a combining process by using the channel estimation estimated at the step 215 and the index m generated by the array gain controlling unit 130, and generates a symbol estimation (S255). For example, when the index m determined by the array gain controlling unit 130 is "1", the combining unit 155 generates the symbol estimation by using a weight vector $W_1$. It is because the transmission signal which is transmitted via the calculation of the transmission vector $G_1$ generates the largest array interference by using the weight vector $W_1$ by the combining unit 155.

When the communication is started by using the determined transmission vector $G_m$, the combining unit 155 performs a proper signal operation by using the channel estimation received from the channel estimating unit 125, and provides the symbol estimation to the maximum likelihood detecting unit 160. The maximum likelihood detecting unit 160 transmits the finally obtained reception signal to the reception signal processing unit 165. The array gain controlling unit 130 continues to search the array interference $I_{Am}$ which maximizes the total gain of the system based on the channel estimation transmitted from the channel estimating unit 125. Note that the channel estimation H can be estimated by the conventional art.

Principle of Operation of First Embodiment

Next, a principle of operation of the first embodiment is described.

<Array Gain Controlling Unit 130>

The array gain controlling unit 130 stores the array interference $I_A$, as the function of the channel vector H. The array interference $I_{Am}$ (m=0, 1) is represented by a mathematical expression 3.

[Expression 3]

$$I_{A0} = h_1^* h_2 + h_1 h_2^*$$

$$I_{A1} = h_1^* h_2 - h_1 h_2^* \qquad (3)$$

The array gain controlling unit 130 performs a calculation of a mathematical expression 4 to select the $I_{Am}$ which maximizes the system gain.

[Expression 4]

$$\operatorname*{argmax}_{m}(I_{Am}), \forall m \in \{0, 1\} \qquad (4)$$

Namely, the largest $I_{Am}$ between the $I_{A0}$ and the $I_{A1}$ is selected. The array gain controlling unit 130 transmits the index m which corresponds to the selected $I_{Am}$ to the feedback transmitting unit 135 and the combining unit 155. The feedback transmitting unit 135 transmits the index m to the first wireless device 11.

<Transmission Vector Selecting Unit 105>

In the following description, the index m is represented by a value of three bits. When the transmission vector selecting unit 105 receives an index [000], it performs the calculation by the transmission vector $G_0$ and transmits, and when the transmission vector selecting unit 105 receives an index [001], it performs the calculation by the transmission vector $G_1$ and transmits (mathematical expression 5).

[Expression 5]

$$G_0 = [s\ s]$$

$$G_1 = [s\ -s] \qquad (5)$$

Namely, when the index m is [000], the transmission antennas 110a and 110b transmit the symbol sequences "s"

and "s", and when the index m is [001], they transmit the symbol sequences "s" and "−s".

<Combining Unit 155>

When the channel vector H is set to be [$h_1$, $h_2$], "T" is the transposed matrix operation, and "n" is set to be a zero-mean additive white Gaussian noise (AWGN), a received signal "y" is represented by a mathematical expression 6 when the combining unit 155 receives [000] as the index m.

[Expression 6]

$$y = G_0 \cdot H^T + n \quad (6)$$

Subsequently, the combining unit 155 performs the combining process by using a weight vector $W_0$ (mathematical expression 7).

[Expression 7]

$$w_0 = [1\ 1] \quad (7)$$

Note that when the index m is [000], a multiplication of the weight vector $W_0$ is not necessary. The combining unit 155 performs a calculation represented by a mathematical expression 8 as the combining process.

[Expression 8]

$$\tilde{S} = yH^* \cdot w_0^T \quad (8)$$
$$\tilde{S} = y[h_1^* h_2^*] \cdot \begin{pmatrix} 1 \\ 1 \end{pmatrix}$$
$$\tilde{S} = S(|h_1|^2 + |h_2|^2) + S(h_1^* h_2 + h_1 h_2^*) + nh_1^* + nh_2^*$$

The symbol estimation which is obtained by the combining unit 155 with the mathematical expression 8 is transmitted to the maximum likelihood decision unit 160 to perform decoding of the symbol. Note that as it is illustrated in the mathematical expression 8 (especially in a third expression), it is a first term which is affected by the gain resulting from a full diversity, and it is a second term (refer to the mathematical expression 3) which is affected by an array gain.

When the combining unit 155 receives [001] as the index m, the received signal is represented by a mathematical expression 9.

[Expression 9]

$$y = G_1 \cdot H^T + n \quad (9)$$

Subsequently, the combining unit 155 performs the combining process by using a weight vector $W_1$ (mathematical expression 10).

[Expression 10]

$$w_1 = [1\ -1] \quad (10)$$

The combining unit 155 performs a calculation represented by a mathematical expression 11 as the combining process.

[Expression 11]

$$\tilde{S} = yH^* \cdot w_1^T \quad (11)$$
$$\tilde{S} = y[h_1^* h_2^*] \cdot \begin{pmatrix} 1 \\ -1 \end{pmatrix}$$
$$\tilde{S} = S(|h_1|^2 + |h_2|^2) + S(-h_1^* h_2 - h_1 h_2^*) + nh_1^* - nh_2^*$$

A symbol estimation which is obtained by the combining unit 155 with the mathematical expression 11 is transmitted to the maximum likelihood decision unit 160 to perform the decoding of the symbol. Note that as illustrated in the mathematical expression 11 (especially in a third expression), it is a first term which is affected by the gain resulting from the full diversity, and it is a second term (refer to the mathematical expression 3) which is affected by the array gain.

As stated above, in the wireless system of this embodiment, the first wireless device being the transmission side selects the transmission vector based on the channel estimation estimated by the second wireless device being the reception side, and therefore, it is possible to improve the total gain of the system. Besides, in the wireless system of this embodiment, only the index indicating the transmission vector which is to be selected by the first wireless device is to be fed back from the second wireless device, and therefore, a broadband line is not necessary for the feedback.

Second Embodiment

Figure 3:
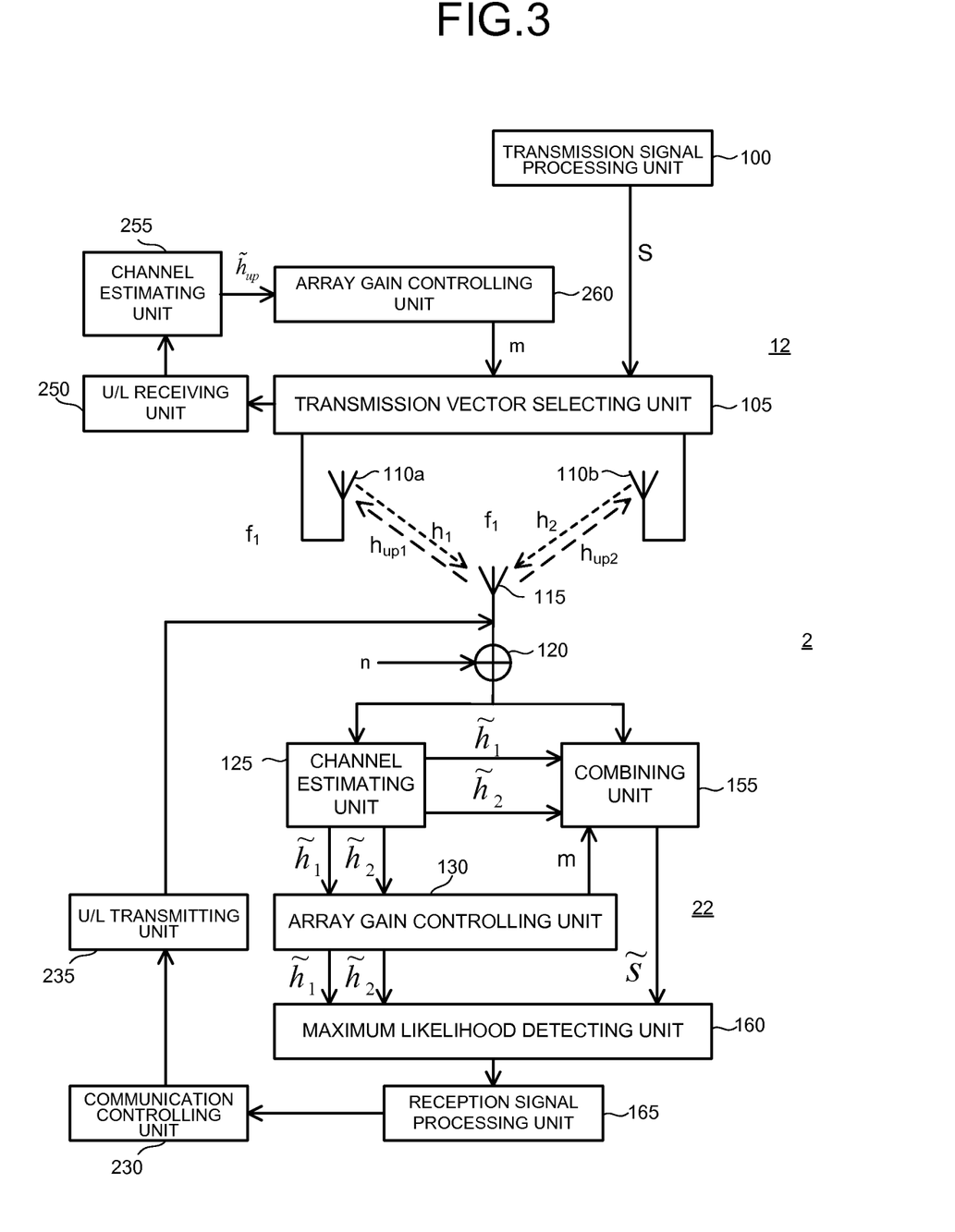
FIG. 3 A block diagram illustrating a configuration of a wireless device according to a second embodiment.

Next, a wireless system according to a second embodiment is described in detail with reference to FIG. 3. As illustrated in FIG. 3, a wireless system 2 of this embodiment includes a first wireless device 12 and a second wireless device 22. The first wireless device 12 in the second embodiment includes an uplink (U/L) receiving unit 250, a channel estimating unit 255, and an array gain controlling unit 260 instead of the feedback receiving unit. Besides, the second wireless device 22 in the second embodiment includes a communication controlling unit 230 and an uplink (U/L) transmitting unit 235 instead of the feedback transmitting unit. In the following description, common reference numerals and symbols are used to designate common elements to the first embodiment illustrated in FIG. 1, and redundant description is not given.

The communication controlling unit 230 is a signal processing block controlling a data transmission (uplink) from the second wireless device 22 to the first wireless device 12. The uplink transmitting unit 235 transmits an uplink signal transmitted from the communication controlling unit 230 to the first wireless device 12 via the (reception) antenna 115 at the frequency $f_1$. The uplink receiving unit 250 receives a signal from the uplink transmitting unit 235 via the (transmission) antennas 110a/110b. The channel estimating unit 255 has a function common to the channel estimating unit 125 of the second wireless device 22, and performs the channel estimation relating to propagation paths $h_{up}$ ($h_{up1}$, $h_{up2}$) from the (reception) antenna 115 to the (transmission) antennas 110a/110b. The array gain controlling unit 260 corresponds to the array gain controlling unit 130 of the second wireless device 22, and determines the index m by using the channel estimation found by the channel estimating unit 255.

Namely, the wireless system 2 of this embodiment constitutes a TDD system in which a downlink frequency from the first wireless device 12 to the second wireless device 22 and an uplink frequency from the second wireless device 22 to the first wireless device 12 are common ($f_1$ in FIG. 3). In case of the TDD system, both the first wireless device 12 being the data transmission side and the second wireless device 22 being the data reception side alternately emit radio waves in the same frequency channel at different time slots. Besides, as a communication system, the transmission side and the reception side alternately play the part. For example, when the first wireless device 12 transmits at a time $T_n$, the second wireless device 22 transmits at a successive time $T_{n+1}$. As a result, the first wireless device 12 and the second wireless device 22 are able to perform the estimation of a wireless channel H while they each operate as a receiver.

In an example illustrated in FIG. 3, the second wireless device 22 performs the estimations of the propagation paths $h_1$, $h_2$, and the first wireless device 12 performs the estimation of the propagation path $h_{up}$. Strictly speaking, the propagation paths $h_1$, $h_2$, $h_{up}$ are different propagation paths, but when the channel estimation relating to the propagation path $h_{up}$ is performed, it can be regarded to be the channel estimations relating to the propagation paths $h_1$, $h_2$ in consideration that they are in the same frequency channel and the Doppler diffusion thereof is small as stated above. As a result, the wireless system 2 of the second embodiment does not need the feedback channel in the wireless system 1 of the first embodiment. On the other hand, in the first wireless device 12 in the second embodiment, the array gain controlling unit 260 is included, and thereby, it is possible to enable the calculation maximizing the total gain of the system for itself.

Operations of Second Embodiment

Figure 4:
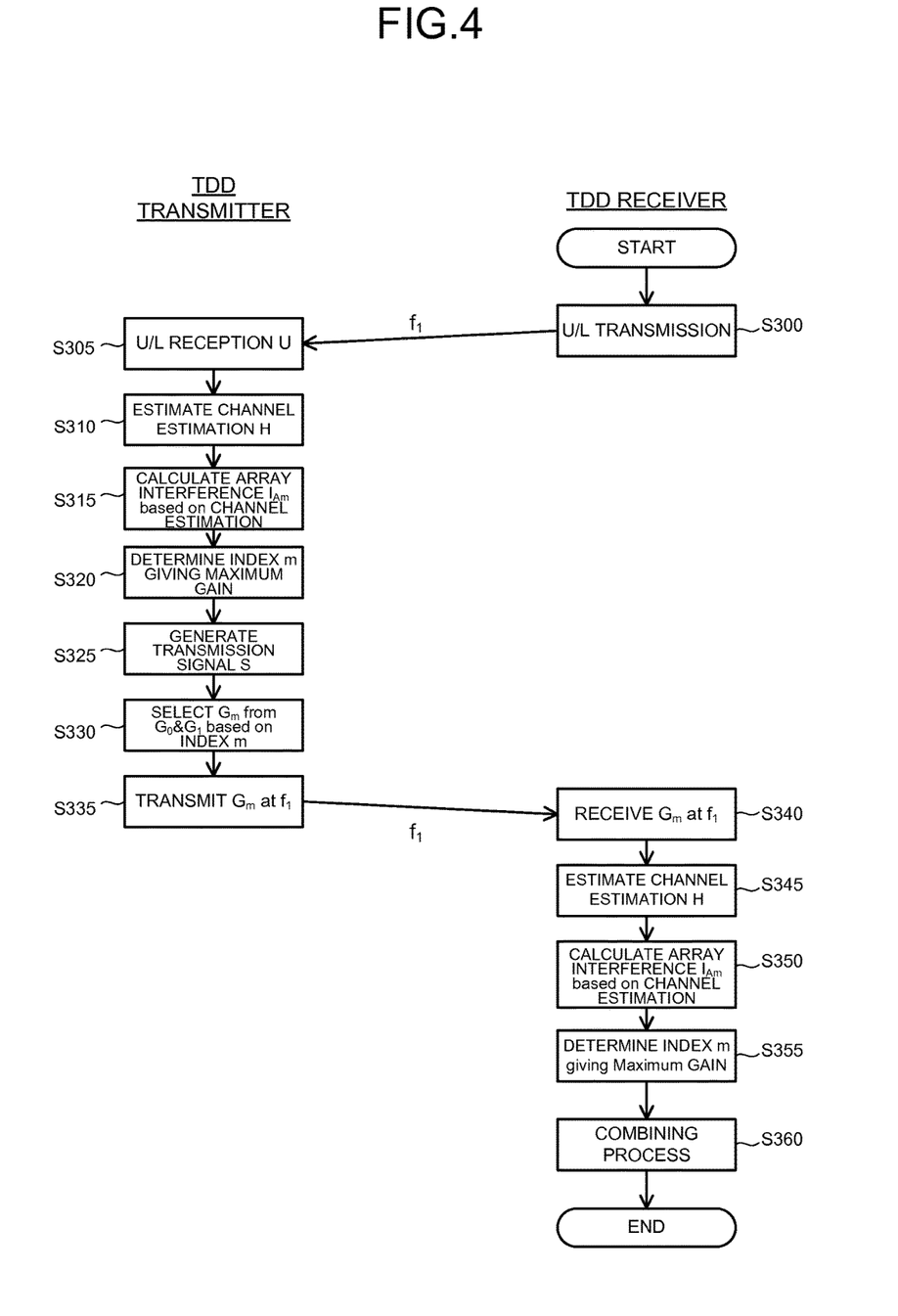
FIG. 4 A flowchart illustrating operations of the wireless device according to the second embodiment.

Subsequently, operations of the wireless system 2 of this embodiment are described with reference to FIGS. 3 and 4. In the wireless system of this embodiment, the index m which is used by the first wireless device 12 being the transmission side to determine the transmission vector $G_m$ is determined by the first wireless device 12 being the transmission side for oneself Namely, the first wireless device 12 performs the channel estimation for itself. The wireless system 2 of the second embodiment is the TDD system, and therefore, the first wireless device 12 and the second wireless device 22 each communicate by using the same frequency $f_1$ at different timings.

The uplink transmitting unit 235 of the second wireless device 22 transmits the uplink signal at the frequency $f_1$ by the control of the communication controlling unit 230 (S300). The uplink receiving unit 250 of the first wireless device 12 receives the uplink signal from the second wireless device 22 (S305).

The channel estimating unit 255 performs the channel estimation of the propagation path $h_{up}$ based on the uplink signal received by the uplink receiving unit 250 (S310). As stated above, at the frequency band of the VHF/UHF band such as the TV white space (TVWS), the Doppler diffusion is small, and therefore, the channel vector H has a quasi-static and extremely low time selectivity, and the temporal variation is relatively small. Accordingly, the channel estimating unit 255 obtains the channel estimations at the $h_1$, $h_2$ by using the channel estimation at the propagation path $h_{up}$. The channel estimating unit 255 transmits the obtained channel estimation to the array gain controlling unit 260.

The array gain controlling unit 260 calculates the array interference $I_{Am}$ by using the obtained channel estimation (S315). Similar to the first embodiment, there are two peculiar transmission vectors $G_m$ (m=0, 1), and the array interferences $I_{Am}$ ($I_{A0}$, $I_{A1}$) respectively corresponding to the $G_m$ ($G_0$, $G_1$) are generated. Besides, the array interferences $I_{Am}$ are each a function of the fading channel H, and therefore, it is possible to calculate in advance. Accordingly, it is possible to store the array interference $I_{Am}$ at a memory in the channel estimating unit 255 of the first wireless device 12, and to calculate the total gain by using the channel estimation. The array gain controlling unit 260 selects one which takes the maximum value by comparing the two $I_{Am}$ (mathematical expression 12).

[Expression 12]

$$\underset{m}{\mathrm{argmax}}(I_{Am}), \forall m \in \{0, 1\} \qquad (12)$$

The array gain controlling unit 260 determines the index m in which the array interference becomes the maximum, and transmits to the transmission vector selecting unit 105 (S320).

The transmission signal processing unit 100 generates the transmission signal S at the frequency $f_1$ (S325), the transmission vector selecting unit 105 selects the transmission vector $G_m$ from the $G_0/G_1$ based on the index m, and performs the calculation of the transmission vector $G_m$ for the transmission signal S (S330).

The transmission vector selecting unit 105 transmits the signals of [s s] or [s −s] from the transmission antennas 110a and 110b (S335). For example, when the index m determined by the array gain controlling unit 260 is "1", the first wireless device 11 performs the calculation of the $G_1$, and transmits [s, −s]. Namely, the symbol sequence "s" is transmitted from the transmission antenna 110a, and the symbol sequence "−s" is transmitted from the transmission antenna 110b.

The reception antenna 115 of the second wireless device 22 receives the transmission signals S via the transmission paths $h_1$ and $h_2$ (S340). At this time, noises n are mixed into a reception signal at the second wireless device 22.

The channel estimating unit 125 performs the channel estimation based on the reception signal (S345). The channel estimating unit 125 transmits the obtained channel estimation to the array gain controlling unit 130.

The array gain controlling unit 130 calculates the array interference $I_{Am}$ by using the obtained channel estimation (S350). In the system of the MISO configuration, there are two peculiar transmission vectors $G_m$ (m=0, 1), and the array interferences $I_{Am}$ ($I_{A0}$, $I_{A1}$) respectively corresponding to the $G_m$ ($G_0$, $G_1$) are generated. The array interferences $I_{Am}$ are each the function of the fading channel H, and therefore, it is possible to calculate in advance. Accordingly, it is possible to store the array interferences $I_{Am}$ at a memory in the channel estimating unit 125 of the second wireless device 22, and to calculate the total gain by using the channel estimation. The array gain controlling unit 130 selects one which takes the maximum value by comparing the two $I_{Am}$.

When the $I_{Am}$ taking the maximum value is selected, the array gain controlling unit 130 determines the corresponding index m and transmits to the combining unit 155 (S355).

The combining unit 155 performs the combining process by using the channel estimation estimated at the step 345 and the index m generated by the array gain controlling unit 130, and generates the symbol estimation (S360). For example, when the determined index m is "1", the combining unit 155 generates the symbol estimation by using the weight vector $W_1$.

When the communication is started by using the determined transmission vector $G_m$, the combining unit 155 performs a proper signal operation by using the channel estimation received from the channel estimating unit 125, and provides the symbol estimation to the maximum likelihood detecting unit 160. The maximum likelihood detecting unit 160 transmits the finally obtained reception signal to the reception signal processing unit 165. The array gain controlling unit 130 continues to search the maximum array interference $I_{Am}$ based on the channel estimation constantly transmitted from the channel estimating unit 125. Note that the channel estimation H can be estimated by the conventional art.

As stated above, in the wireless system of this embodiment, the first wireless device being the transmission side selects the transmission vector based on the channel estimation estimated by the first wireless device being the transmission side, and therefore, it is possible to improve the total gain of the system even if there is not the feedback line from the second wireless device. In particular, it is effective in the TDD system where the frequency of the transmission/reception circuits are common.

Third Embodiment

Figure 5:
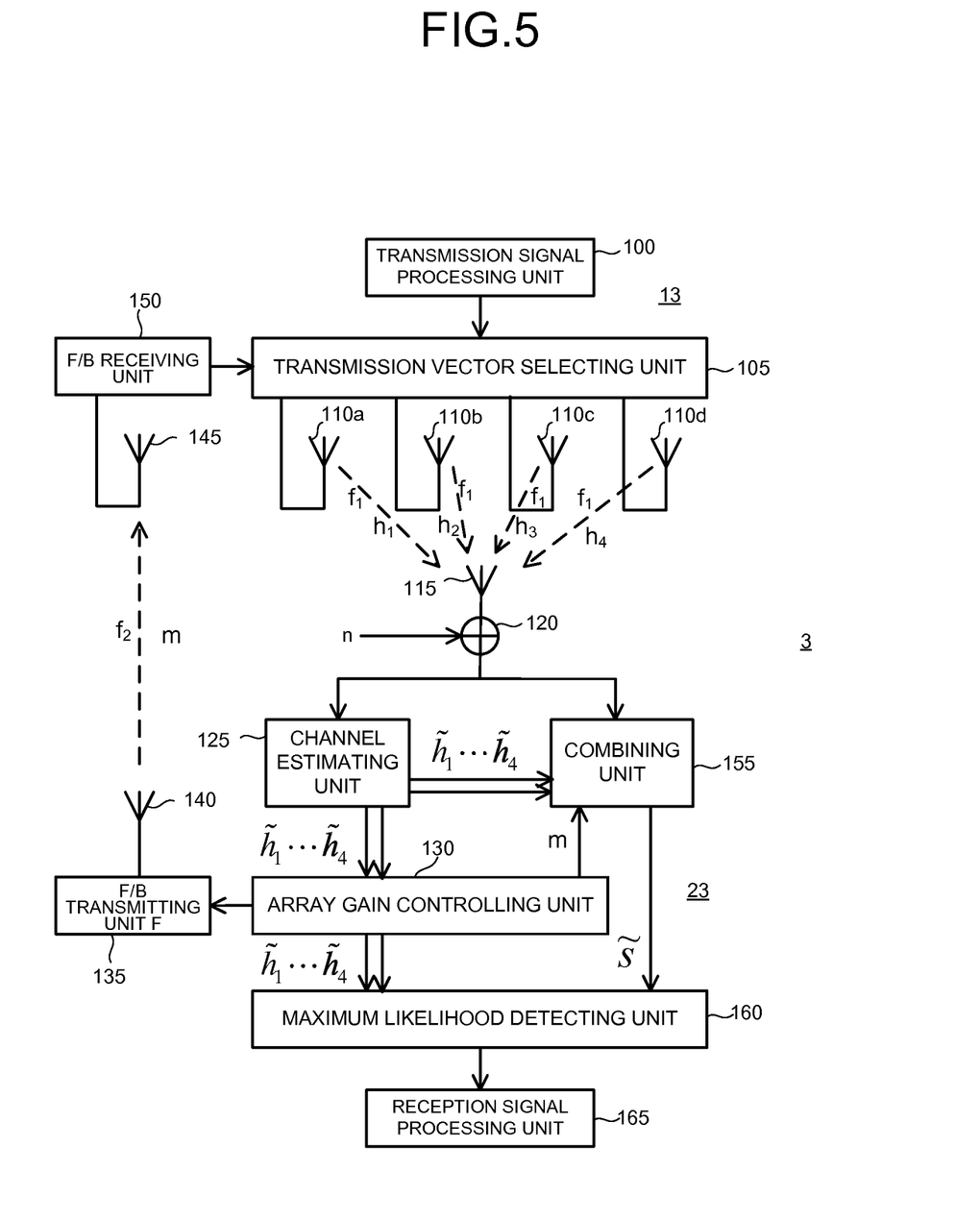
FIG. 5 A block diagram illustrating a configuration of a wireless device according to a third embodiment.

Next, a wireless system according to a third embodiment is described in detail with reference to FIG. 5. As illustrated in FIG. 5, a wireless system 3 of this embodiment includes a first wireless device 13 and a second wireless device 23. The wireless system 3 of this embodiment is one in which four transmission antennas are provided as transmission antennas 110a to 110d instead of the transmission antennas 110a and 110b of the first wireless device 11 according to the first embodiment illustrated in FIGS. 1 and 2. In the following description, common reference numerals and symbols are used to designate common elements to the first embodiment illustrated in FIG. 1, and redundant description is not given.

Principle of Operation of Third Embodiment

Hereinafter, a principle of operation of the third embodiment is described.

<Array Gain Controlling Unit>

In the wireless system 3 of this embodiment, transfer paths of the channel estimation estimated by the channel estimating unit 125 are four kinds of $h_1$ to $h_4$, and combinations of the array interferences searched by the array gain controlling unit 130 become 8 kinds. Namely, the transmission vectors $G_m$ and the weight vectors $W_m$ are respectively selected from 8 kinds of $G_0$ to $G_7$, $W_0$ to $W_7$. Accordingly, the combinations of the array interferences $I_{Am}$ become 8 kinds represented by a mathematical expression 13.

[Expression 13]

$$I_{A0}=h_1*h_2+h_1h_2*+h_1*h_3+h_1h_3*+h_1*h_4+h_1h_4*+h_2*h_3+h_2h_3*+h_2*h_4+h_2h_4*+h_3*h_4+h_3h_4*$$

$$I_{A1}=-h_1*h_2-h_1h_2*-h_1*h_4-h_1h_4*+h_2*h_3-h_2h_3*-h_3*h_4-h_3h_4*+h_1*h_3+h_1h_3*+h_2*h_4+h_3h_4*$$

$$I_{A2}=-h_1*h_3-h_1h_3*-h_1*h_4-h_1h_4*-h_2*h_3-h_2h_3*-h_2*h_4-h_2h_4*+h_1*h_2+h_1h_2*+h_3*h_4+h_3h_4*$$

$$I_{A3}=-h_1*h_2-h_1h_2*-h_1*h_3-h_1h_3*-h_2*h_4+h_2h_4*-h_3*h_4+h_3h_4*+h_1*h_4+h_1h_4*+h_2*h_3+h_2h_3*$$

$$I_{A4}=-h_1*h_4-h_1h_4*-h_2*h_4-h_2h_4*-h_3*h_4-h_3h_4*+h_1*h_2+h_1h_2*+h_1*h_3+h_1h_3*+h_2*h_3+h_2h_3*$$

$$I_{A5}=-h_1*h_3-h_1h_3*-h_2*h_3-h_2h_3*-h_3*h_4-h_3h_4*+h_1*h_2+h_1h_2*+h_1*h_4+h_1h_4*+h_2*h_4+h_2h_4*$$

$$I_{A6}=-h_1*h_2-h_1h_2*-h_2*h_3-h_2h_3*-h_2*h_4-h_2h_4*+h_1*h_3+h_1h_3*+h_1*h_4+h_1h_4*+h_3*h_4+h_3h_4*$$

$$I_{A7}=-h_1*h_2-h_1h_2*-h_1*h_3-h_1h_3*-h_1*h_4-h_1h_4*+h_2*h_3+h_2h_3*+h_2*h_4+h_2h_4*+h_3*h_4+h_3h_4* \quad (13)$$

The array gain controlling unit 130 searches the array interference $I_{Am}$ to be the maximum (mathematical expression 14).

[Expression 14]

$$\operatorname*{argmax}_{m}(I_{Am}), \forall m \in \{0, 1, 2, 3, 4, 5, 6, 7\} \quad (14)$$

Namely, the $I_{Am}$ which is the maximum is selected from among $I_{A0}$ to $I_{A7}$. The array gain controlling unit 130 transmits the index m corresponding to the selected $I_{Am}$ to the feedback transmitting unit 135 and the combining unit 155. The feedback transmitting unit 135 transmits the index m to the first wireless device 13.

<Transmission Vector Selecting Unit 105>

In the following description, the index m is represented by a value of three bits. The transmission vector selecting unit 105 receives the indexes [000] [001] [010] [011] [110] [111], performs the calculations by the transmission vectors $G_0$ to $G_7$ respectively, and transmits them (mathematical expression 15).

[Expression 15]

$$G_0=[s\ s\ s\ s]$$

$$G_1=[s\ -s\ s\ -s]$$

$$G_2=[s\ s\ -s\ -s]$$

$$G_3=[s\ -s\ -s\ s]$$

$$G_4=[s\ s\ s\ -s]$$

$$G_5=[S\ s\ -s\ s]$$

$$G_6=[s\ -s\ s\ s]$$

$$G_7=[-s\ s\ s\ s] \quad (15)$$

<Combining unit 155>

The channel vectors H are set to be $[h_1\ h_2\ h_3\ h_4]$, and it is assumed that the channel estimation is perfectly performed to simplify the description (mathematical expression 16).

[Expression 16]

$$\tilde{H}=H \quad (16)$$

When the combining unit 155 receives [000] from the array gain controlling unit 130 as the index m, the combining unit 155 performs the combining process represented by a mathematical expression 18 by using a weight vector represented by a mathematical expression 17.

[Expression 17]

$$w_0 = [1\ 1\ 1\ 1] \quad (17)$$

[Expression 18]

$$\tilde{S} = yH^* \cdot w_0^T \quad (18)$$

$$\tilde{S} = y[h_1^* h_2^* h_3^* h_4^*] \cdot \begin{pmatrix} 1 \\ 1 \\ 1 \\ 1 \end{pmatrix}$$

$$\tilde{S} = S(|h_1|^2 + |h_2|^2 + |h_3|^2 + |h_4|^2) + S(h_1^* h_2 + h_1 h_2^* + h_1^* h_3 + h_1 h_3^* + h_1^* h_4 + h_1 h_4^* + h_2^* h_3 + h_2 h_3^* + h_2^* h_4 + h_2 h_4^* + h_3^* h_4 + h_3 h_4^*) + nh_1^* + nh_2^* + nh_3^* + nh_4^*$$

A symbol estimation obtained by the combining unit 155 by the mathematical expression 18 is transmitted to the maximum likelihood decision unit 160 to perform the decoding of a symbol.

When the combining unit 155 receives [001] from the array gain controlling unit 130 as the index m, the combining unit 155 performs the combining process represented by a mathematical expression 20 by using a weight vector represented by a mathematical expression 19.

[Expression 19]

$$w_1 = [\,1 \quad -1 \quad 1 \quad -1\,] \quad (19)$$

[Expression 20]

$$\tilde{S} = yH^* \cdot w_1^T \quad (20)$$

$$\tilde{S} = y[h_1^* h_2^* h_3^* h_4^*] \cdot \begin{pmatrix} 1 \\ -1 \\ 1 \\ -1 \end{pmatrix}$$

$$\tilde{S} = S(|h_1|^2 + |h_2|^2 + |h_3|^2 + |h_4|^2) + S(-h_1^* h_2 - h_1 h_2^* - h_1^* h_4 - h_1 h_4^* - h_2^* h_3 - h_2 h_3^* - h_3^* h_4 - h_3 h_4^* + h_1^* h_3 + h_1 h_3^* + h_2^* h_4 + h_2 h_4^*) + nh_1^* - nh_2^* + nh_3^* - nh_4^*$$

A symbol estimation obtained by the combining unit 155 by the mathematical expression 20 is transmitted to the maximum likelihood decision unit 160 to perform the decoding of the symbol.

When the combining unit 155 receives [010] from the array gain controlling unit 130 as the index m, the combining unit 155 performs the combining process represented by a mathematical expression 22 by using a weight vector represented by a mathematical expression 21.

[Expression 21]

$$w_2 = [\,1 \quad 1 \quad -1 \quad -1\,] \quad (21)$$

[Expression 22]

$$\tilde{S} = yH^* \cdot w_2^T \quad (22)$$

$$\tilde{S} = y[h_1^* h_2^* h_3^* h_4^*] \cdot \begin{pmatrix} 1 \\ 1 \\ -1 \\ -1 \end{pmatrix}$$

$$\tilde{S} = S(|h_1|^2 + |h_2|^2 + |h_3|^2 + |h_4|^2) + S(-h_1^* h_3 - h_1 h_3^* - h_1^* h_4 - h_1 h_4^* - h_2^* h_3 - h_2 h_3^* - h_2^* h_4 - h_2 h_4^* + h_1^* h_2 + h_1 h_2^* + h_3^* h_4 + h_3 h_4^*) + nh_1^* + nh_2^* - nh_3^* - nh_4^*$$

A symbol estimation obtained by the combining unit 155 by the mathematical expression 22 is transmitted to the maximum likelihood decision unit 160 to perform the decoding of the symbol.

When the combining unit 155 receives [011] from the array gain controlling unit 130 as the index m, the combining unit 155 performs the combining process represented by a mathematical expression 24 by using a weight vector represented by a mathematical expression 23.

[Expression 23]

$$w_3 = [\,1 \quad -1 \quad -1 \quad 1\,] \quad (23)$$

[Expression 24]

$$\tilde{S} = yH^* \cdot w_3^T \quad (24)$$

$$\tilde{S} = y[h_1^* h_2^* h_3^* h_4^*] \cdot \begin{pmatrix} 1 \\ -1 \\ -1 \\ 1 \end{pmatrix}$$

$$\tilde{S} = S(|h_1|^2 + |h_2|^2 + |h_3|^2 + |h_4|^2) + S(-h_1^* h_2 - h_1 h_2^* - h_1^* h_3 - h_1 h_3^* - h_2^* h_4 - h_2 h_4^* - h_3^* h_4 - h_3 h_4^* + h_1^* h_4 + h_1 h_4^* + h_2^* h_3 + h_2 h_3^*) + nh_1^* - nh_2^* - nh_3^* + nh_4^*$$

A symbol estimation obtained by the combining unit 155 by the mathematical expression 24 is transmitted to the maximum likelihood decision unit 160 to perform the decoding of the symbol.

When the combining unit 155 receives [100] from the array gain controlling unit 130 as the index m, the combining unit 155 performs the combining process represented by a mathematical expression 26 by using a weight vector represented by a mathematical expression 25.

[Expression 25]

$$w_4 = [\,1 \quad 1 \quad 1 \quad -1\,] \quad (25)$$

[Expression 26]

$$\tilde{S} = yH^* \cdot w_4^T \quad (26)$$

$$\tilde{S} = y[h_1^* h_2^* h_3^* h_4^*] \cdot \begin{pmatrix} 1 \\ 1 \\ 1 \\ -1 \end{pmatrix}$$

$$\tilde{S} = S(|h_1|^2 + |h_2|^2 + |h_3|^2 + |h_4|^2) + S(-h_1^* h_4 - h_1 h_4^* - h_2^* h_4 - h_2 h_4^* - h_3^* h_4 - h_3 h_4^* + h_1^* h_2 + h_1 h_2^* + h_1^* h_3 + h_1 h_3^* + h_2^* h_3 + h_2 h_3^*) + nh_1^* + nh_2^* + nh_3^* - nh_4^*$$

A symbol estimation obtained by the combining unit 155 by the mathematical expression 26 is transmitted to the maximum likelihood decision unit 160 to perform the decoding of the symbol.

When the combining unit 155 receives [101] from the array gain controlling unit 130 as the index m, the combining unit 155 performs the combining process represented by a mathematical expression 28 by using a weight vector represented by a mathematical expression 27.

[Expression 27]

$$w_5 = [1 \ 1 \ -1 \ 1] \quad (27)$$

[Expression 28]

$$\tilde{S} = yH^* \cdot w_5^T \quad (28)$$

$$\tilde{S} = y[h_1^* h_2^* h_3^* h_4^*] \cdot \begin{pmatrix} 1 \\ 1 \\ -1 \\ 1 \end{pmatrix}$$

$$\tilde{S} = S(|h_1|^2 + |h_2|^2 + |h_3|^2 + |h_4|^2) +$$
$$S(-h_1^* h_3 - h_1 h_3^* - h_2^* h_3 - h_2 h_3^* - h_3^* h_4 - h_3 h_4^* + h_1^* h_2 + h_1 h_2^* +$$
$$h_1^* h_4 + h_1 h_4^* + h_2^* h_4 + h_2 h_4^*) + nh_1^* + nh_2^* - nh_3^* + nh_4^*$$

A symbol estimation obtained by the combining unit 155 by the mathematical expression 28 is transmitted to the maximum likelihood decision unit 160 to perform the decoding of the symbol.

When the combining unit 155 receives [110] from the array gain controlling unit 130 as the index m, the combining unit 155 performs the combining process represented by a mathematical expression 30 by using a weight vector represented by a mathematical expression 29.

[Expression 29]

$$w_6 = [1 \ -1 \ 1 \ 1] \quad (29)$$

[Expression 30]

$$\tilde{S} = yH^* \cdot w_6^T \quad (30)$$

$$\tilde{S} = y[h_1^* h_2^* h_3^* h_4^*] \cdot \begin{pmatrix} 1 \\ -1 \\ 1 \\ 1 \end{pmatrix}$$

$$\tilde{S} = S(|h_1|^2 + |h_2|^2 + |h_3|^2 + |h_4|^2) +$$
$$S(-h_1^* h_2 - h_1 h_2^* - h_2^* h_3 - h_2 h_3^* - h_2^* h_4 - h_2 h_4^* + h_1^* h_3 + h_1 h_3^* +$$
$$h_1^* h_4 + h_1 h_4^* + h_3^* h_4 + h_3 h_4^*) + nh_1^* - nh_2^* + nh_3^* + nh_4^*$$

A symbol estimation obtained by the combining unit 155 by the mathematical expression 30 is transmitted to the maximum likelihood decision unit 160 to perform the decoding of the symbol.

When the combining unit 155 receives [111] from the array gain controlling unit 130 as the index m, the combining unit 155 performs the combining process represented by a mathematical expression 32 by using a weight vector represented by a mathematical expression 31.

[Expression 31]

$$w_7 = [-1 \ 1 \ 1 \ 1] \quad (31)$$

[Expression 32]

$$\tilde{S} = yH^* \cdot w_7^T \quad (32)$$

$$\tilde{S} = y[h_1^* h_2^* h_3^* h_4^*] \cdot \begin{pmatrix} -1 \\ 1 \\ 1 \\ 1 \end{pmatrix}$$

$$\tilde{S} = S(|h_1|^2 + |h_2|^2 + |h_3|^2 + |h_4|^2) +$$
$$S(-h_1^* h_2 - h_1 h_2^* - h_1^* h_3 - h_1 h_3^* - h_1^* h_4 - h_1 h_4^* + h_2^* h_3 + h_2 h_3^* +$$
$$h_2^* h_4 + h_2 h_4^* + h_3^* h_4 + h_3 h_4^*) - nh_1^* + nh_2^* + nh_3^* + nh_4^*$$

A symbol estimation obtained by the combining unit 155 by the mathematical expression 32 is transmitted to the maximum likelihood decision unit 160 to perform the decoding of the symbol.

As illustrated in each of the mathematical expressions 18, 20, 22, 24, 26, 28, 30, and 32 (especially in the third expression each thereof), it is a first term which is affected by the gain resulting from the full diversity, and it is a second term (refer to the mathematical expression 13) which is affected by the array gain.

Note that the third embodiment is one in which the number of transmission antennas in the first embodiment is increased, but it is not limited thereto. The similar effect can be obtained also in a case when the number of transmission antennas in the second embodiment is increased. Namely, it can be applied to both the FDD system and the TDD system.

As stated above, in the wireless system of this embodiment, the number of transmission antennas of the first wireless device is increased, and therefore, it is possible to increase the number of selective combinations of the array interferences. Namely, it is possible to carefully improve the gain by the array interference.

Fourth Embodiment

Figure 6:
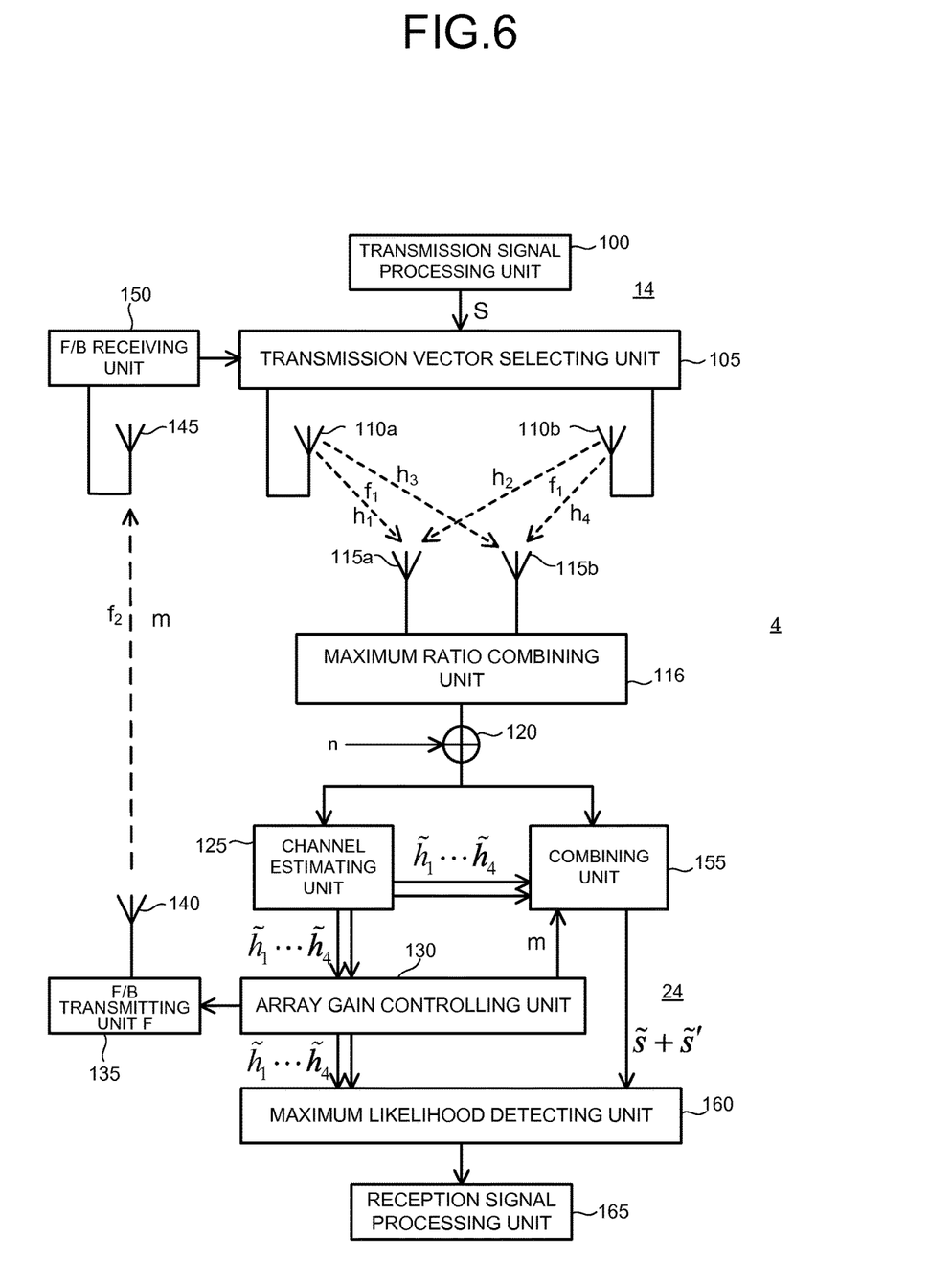
FIG. 6 A block diagram illustrating a configuration of a wireless device according to a fourth embodiment.

Subsequently, a wireless system according to a fourth embodiment is described in detail with reference to FIG. 6. The wireless system of this embodiment is one in which the reception antenna of the second wireless device 21 in the wireless system 1 according to the first embodiment illustrated in FIG. 1 is pluralized. In the following description, common reference numerals and symbols are used to designate common elements to the first embodiment illustrated in FIG. 1, and redundant description is not given. As illustrated in FIG. 6, a second wireless device 24 of this embodiment includes a maximum ratio combining unit 116. The maximum ratio combining unit 116 combines reception signals received by reception antennas 115a and 115b by a maximum ratio combining (MRC) method.

Principle of Operation of Fourth Embodiment

Hereinafter, a principle of operation of the fourth embodiment is described. The maximum ratio combining unit 116 combines the reception signals received by the reception antennas 115a and 115b, and transmits to the channel estimating unit 125 and the combining unit 155.

<Array Gain Controlling Unit 130>

The array gain controlling unit 130 performs a calculation represented by a mathematical expression 33. In the following description, a case in which the number of reception antennas of the second wireless device is two and the number of transmission antennas of a first transmission device is four is described.

[Expression 33]

$$\underset{m}{\operatorname{argmax}}(I_{Am} + I'_{Am}), \forall m \in \{0, 1\} \tag{33}$$

Similarly, when the number of transmission antennas of the first wireless device 14 is four, the array gain controlling unit 130 performs a calculation represented by a mathematical expression 34.

[Expression 34]

$$\underset{m}{\operatorname{argmax}}(I_{Am} + I'_{Am}), \forall m \in \{0, 1, 2, 3, 4, 5, 6, 7\} \tag{34}$$

Here, the $I_{Am}$ represents the array interference received by the first reception antenna 115a of the second wireless device, and this is the same as the first embodiment. The $I'_{Am}$ represents an array interference received by the second reception antenna 115b of the second wireless device. The channel vectors H to the second reception antenna 115b of the second wireless device are represented by [h3 h4] when the number of transmission antennas is two, and by [h5 h6 h7 h8] when the number of transmission antennas is four. The array interferences $I'_{Am}$ for the second reception antenna are represented by a mathematical expression 35 when the number of transmission antennas is two, and by a mathematical expression 36 when the number of transmission antennas is four.

[Expression 35]

$$I'_{A0} = h_3{}^*h_4 + h_3h_4{}^*$$

$$I'_{A1} = h_3{}^*h_4 - h_3h_4{}^* \tag{35}$$

[Expression 36]

$$I'_{A0} = h_5{}^*h_6 + h_5h_6{}^* + h_5{}^*h_7 + h_5h_7{}^* + h_5{}^*h_8 + h_5h_8{}^* + h_6{}^*h_7 + h_6h_7{}^* + h_6{}^*h_8 + h_6h_8{}^* + h_7{}^*h_8 + h_7h_8{}^*$$

$$I'_{A1} = -h_5{}^*h_6 - h_5h_6{}^* - h_5{}^*h_8 - h_5h_8{}^* - h_6{}^*h_7 - h_6h_7{}^* - h_7{}^*h_8 - h_7h_8{}^* + h_5{}^*h_7 + h_5h_7{}^* + h_6{}^*h_8 + h_6h_8{}^*$$

$$I'_{A2} = -h_5{}^*h_7 - h_5h_7{}^* - h_5{}^*h_8 - h_5h_8{}^* - h_6{}^*h_7 - h_6h_7{}^* - h_6{}^*h_8 - h_6h_8{}^* + h_5{}^*h_6 + h_5h_6{}^* + h_7{}^*h_8 + h_7h_8{}^*$$

$$I'_{A3} = -h_5{}^*h_6 - h_5h_6{}^* - h_5{}^*h_7 - h_5h_7{}^* - h_6{}^*h_8 - h_6h_8{}^* - h_7{}^*h_8 - h_7h_8{}^* + h_5{}^*h_8 + h_5h_8{}^* + h_6{}^*h_7 + h_6h_7{}^*$$

$$I'_{A4} = -h_5{}^*h_8 - h_5h_8{}^* - h_6{}^*h_8 - h_6h_8{}^* - h_7{}^*h_8 - h_7h_8{}^* + h_5{}^*h_6 + h_5h_6{}^* + h_5{}^*h_7 + h_5h_7{}^* + h_6{}^*h_7 + h_6h_7{}^*$$

$$I'_{A5} = -h_5{}^*h_7 - h_5h_7{}^* - h_6{}^*h_7 - h_6h_7{}^* - h_7{}^*h_8 - h_7h_8{}^* + h_5{}^*h_6 + h_5h_6{}^* + h_5{}^*h_8 + h_5h_8{}^* + h_6{}^*h_8 + h_6h_8{}^*$$

$$I'_{A6} = -h_5{}^*h_6 - h_5h_6{}^* - h_6{}^*h_7 - h_6h_7{}^* - h_6{}^*h_8 - h_6h_8{}^* + h_5{}^*h_7 + h_5h_7{}^* + h_5{}^*h_8 + h_5h_8{}^* + h_7{}^*h_8 + h_7h_8{}^*$$

$$I'_{A7} = -h_5{}^*h_6 - h_5h_6{}^* - h_5{}^*h_7 - h_5h_7{}^* - h_5{}^*h_8 - h_5h_8{}^* + h_6{}^*h_7 + h_6h_7{}^* + h_6{}^*h_8 + h_6h_8{}^* + h_7{}^*h_8 + h_7h_8{}^* \tag{36}$$

The array gain controlling unit 130 determines the index m which maximizes a sum of ($I_{Am} + I'_{Am}$), and transmits to the first wireless device via the feedback transmitting unit 135 and the feedback receiving unit 150, and transmits to the combining unit 155. The combining unit 155 transmits a combined signal represented by a mathematical expression 37 to the maximum likelihood decision unit 160.

[Expression 37]

$$\tilde{S} + \tilde{S}' \tag{37}$$

Here, parameters illustrated in a mathematical expression 38 are similar to the first embodiment.

[Expression 38]

$$\tilde{S} \tag{38}$$

Besides, parameters illustrated in a mathematical expression 39 are given by a mathematical expression 40.

[Expression 39]

$$\tilde{S}' \tag{39}$$

[Expression 40]

$$\tilde{S}' = y'H^* \cdot w_m{}^T \tag{40}$$

Here, the "y'" is a signal received by the second reception antenna, the "H*" is the channel vector [$h_3$ $h_4$] (when the number of transmission antennas is two) or [$h_5$ $h_6$ $h_8$] (when the number of transmission antennas is four).

Note that the fourth embodiment is one in which the number of reception antennas in the first embodiment is increased, but it is not limited thereto. The similar effect can be obtained also in a case when the number of reception antennas in the second embodiment is increased. Namely, it can be applied to both the FDD system and the TDD system. Besides, the third embodiment and the fourth embodiment may be combined and the number of transmission antennas of the first wireless device and the number of reception antennas of the second wireless device may each be increased.

As stated above, in the wireless system of this embodiment, the number of reception antennas of the second wireless device is increased, and therefore, it is possible to increase selective combinations of the array interferences. Namely, it is possible to carefully improve the gain by the array interference.

As it is described hereinabove, according to the present embodiments, it is possible to enable improvement in reliability of communication, enlargement of cell regions, improvement in PER, and improvement in system performance by adding the array gain in addition to the diversity of full rank.

(Application Examples of Embodiments)

Figure 7:
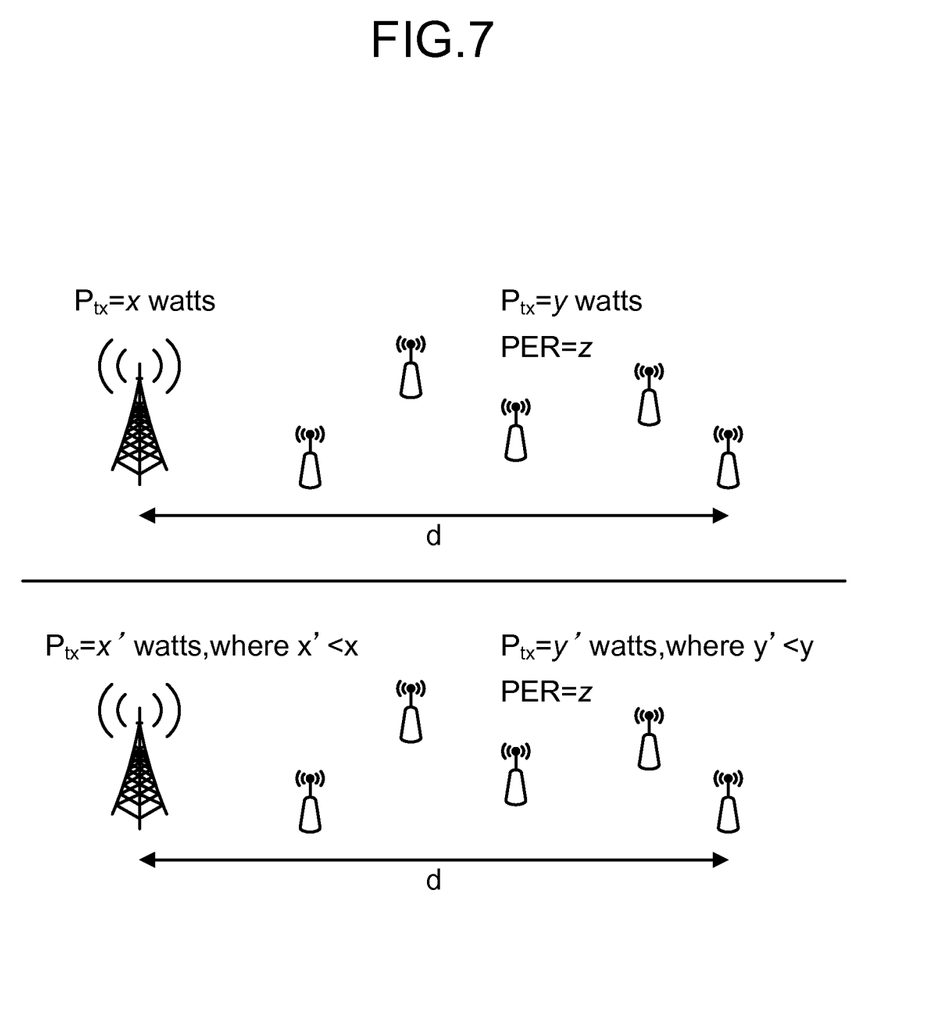
FIG. 7 A conceptual view illustrating an application example of the present invention.
Figure 8:
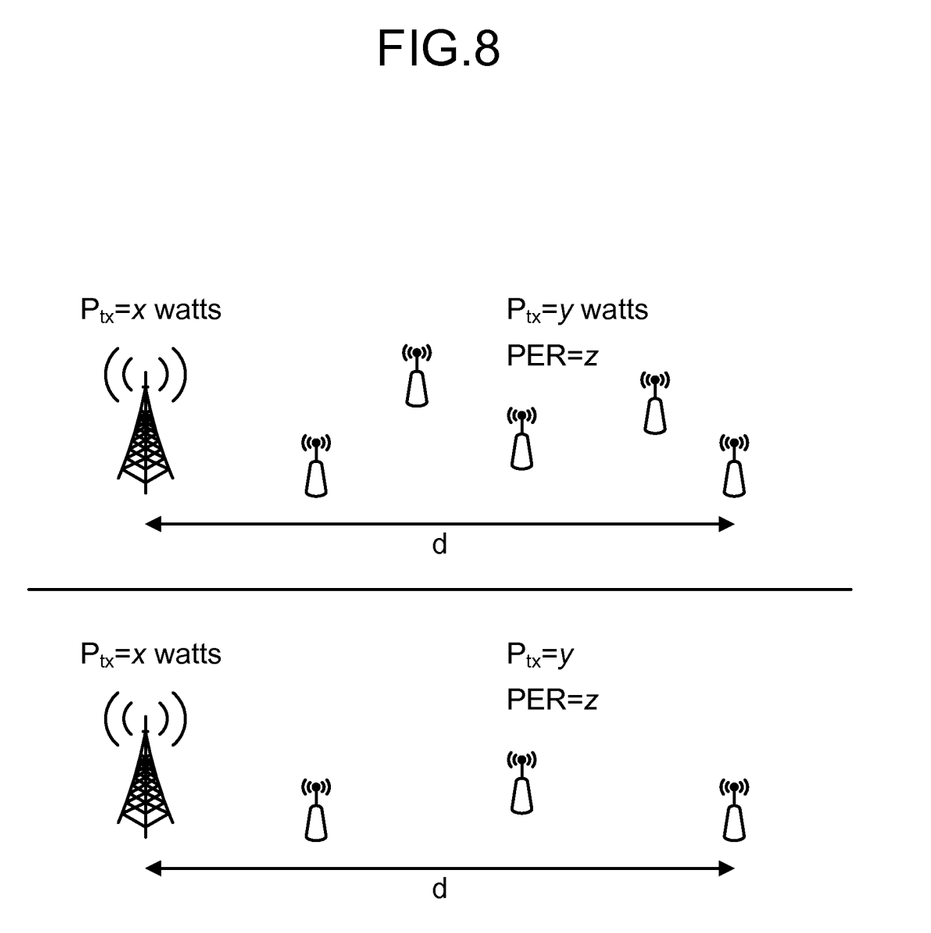
FIG. 8 A conceptual view illustrating an application example of the present invention.

Here, concrete application examples of the present invention are described with reference to FIGS. 7 and 8. For example, a multi-hop relay has been studied in 802.22b standardization initiative. This is to provide a monitoring network covering a relatively long distance d from a base station to a relay node with a low transmission power.

The present invention is advantageous in a quasi-static fading channel peculiar to 802.22b, and it is possible to use the array interference because the electric powers at the base station and the relay node are reduced while keeping a target packet error rate (PER). An upper side in FIG. 7 is a case when the base station transmits with a power $P_{tx} = x$ [W] and the relay node transmits with a power $P_{tx} = y$ [W], and it is an example when the PER becomes "z" according to the conventional art. In case of a lower side where the present invention is applied, it becomes possible to reduce the powers $P_{tx}$ required for the base station and the relay node under a state in which the PER at the distance d is kept.

In other words, when the present invention is applied, it becomes possible to enlarge a distance between the relay nodes covering the same area with the same transmission power. In this case, the transmission powers of the base station and the relay node are kept, but the number of relay nodes required to cover the same distance d becomes small. An upper side in FIG. 8 is a case when the base station transmits with the power $P_{tx}$=x [W] and the relay node transmits with the power $P_{tx}$=y [W], and it is an example when the PER becomes "z" according to the conventional art. In case of a lower side where the present invention is applied, it becomes possible to reduce the number of relay nodes required to cover the same distance d at the same PER when the transmission powers $P_{tx}$ of the base station and the relay node are kept.

It should be noted that the present invention is not limited to the above-described embodiments as they are, and in an implementation stage, it can be embodied by modifying components thereof within a range not departing from the spirit of the invention. Also, the plural components disclosed in the above-described embodiments can be appropriately combined to form various inventions. For example, some of all the components shown in the embodiments may be eliminated. Moreover, components from different embodiments may be combined appropriately.

EXPLANATION OF REFERENCE SIGNS

1 . . . wireless system, 11 . . . first wireless device, 100 . . . transmission signal processing unit, 105 . . . transmission vector selecting unit 105, 110a, 110b . . . transmission antenna, 115 . . . (reception) antenna, 120 . . . noise mixture source, 125 . . . channel estimating unit, 130 . . . array gain controlling unit, 135 . . . feedback transmitting unit, 140 . . . transmission antenna, 145 . . . reception antenna, 150 . . . feedback receiving unit, 155 . . . combining unit, 160 . . . maximum likelihood detecting unit, 165 . . . reception signal processing unit

The invention claimed is:

1. A wireless device to transmit information for a counterpart wireless device, comprising:
a signal processor to generate a symbol sequence;
a transmission vector calculator to convert the symbol sequence into a plurality of transmission symbol sequences, and control phases of the transmission symbol sequences to be a coordinate phase or an opposite phase based on a channel estimation to the counterpart wireless device;
a plurality of antennas to respectively transmit the plurality of transmission symbol sequences;
an uplink receiver to receive an uplink signal from the counterpart wireless device;
a channel estimating unit to estimate the channel estimation based on the uplink signal; and
an array gain controller to generate array interferences to the counterpart wireless device based on the channel estimation, and select an array interference having a higher gain of a signal for the counterpart wireless device from among the generated array interferences,
wherein the transmission vector calculator controls the phases to be a combination of phases in which the respective phases of the transmission symbol sequences generate the array interference selected by the array gain controlling unit.

2. A wireless device which receives information from a counterpart wireless device having a plurality of transmission antennas, comprising:
a channel estimating unit to generate a channel estimation from the counterpart wireless device based on a reception signal transmitted from the counterpart wireless device;
an array gain controller to generate array interferences from the counterpart wireless device based on the channel estimation, and select; select an array interference having a higher gain for the reception signal from among the generated array interferences; and
a feedback transmitter to transmit information indicating a combination configured to generate the array interference selected by the array gain controlling unit from among combinations of phases of transmission symbol sequences transmitted from the plurality of respective transmission antennas to the counterpart wireless device.

3. The wireless device according to claim 2, further comprising:
a plurality of reception antennas configured to receive a plurality of the reception signals; and
a combining unit configured to combine each of the signals received by the plurality of reception antennas,
wherein the channel estimating unit generates the channel estimation based on a signal combined by the combining unit.

* * * * *